United States Patent
Jarvis et al.

(10) Patent No.: US 11,502,484 B2
(45) Date of Patent: Nov. 15, 2022

(54) DEVICES AND METHODS FOR INSTALLATION TOOLS FOR USE WITH SPLICE KITS

(71) Applicant: nVent Services GmbH, Schaffhausen (CH)

(72) Inventors: William Edward Jarvis, Millbrae, CA (US); Wesley Dong, Belmont, CA (US)

(73) Assignee: nVent Services GmbH, Schaffhausen (CH)

( * ) Notice: Subject to any disclaimer, the term of this patent is extended or adjusted under 35 U.S.C. 154(b) by 112 days.

(21) Appl. No.: 17/175,361

(22) Filed: Feb. 12, 2021

(65) Prior Publication Data

US 2021/0257818 A1 Aug. 19, 2021

Related U.S. Application Data

(60) Provisional application No. 62/976,910, filed on Feb. 14, 2020.

(51) Int. Cl.
*H02G 1/00* (2006.01)
*H01R 4/20* (2006.01)
(Continued)

(52) U.S. Cl.
CPC .............. *H02G 1/005* (2013.01); *H01R 4/20* (2013.01); *H01R 4/72* (2013.01); *H02G 1/14* (2013.01); *H05B 3/06* (2013.01); *H05B 3/56* (2013.01)

(58) Field of Classification Search
CPC . H01R 4/20; H01R 4/72; H02G 1/005; H02G 1/14; H05B 3/06; H05B 3/56
See application file for complete search history.

(56) References Cited

U.S. PATENT DOCUMENTS 2,867,680 A  1/1959 Stecher
3,360,631 A  12/1967 Hess
(Continued)

FOREIGN PATENT DOCUMENTS

CA  2499184  * 9/2005
CA  2832295  * 10/2012
(Continued)

OTHER PUBLICATIONS

EasyHeat SR Trace Cable Cable Connection Kits and Accessories, screen shot of catalog page, Copyright 2021 Emerson Electric Co., retrieved from the internet May 13, 2021, 2 pages.
(Continued)

*Primary Examiner* — Carl J Arbes
(74) *Attorney, Agent, or Firm* — Quarles & Brady LLP

(57) ABSTRACT

An installation tool and methods for installing a splice kit for a heating cable is provided. The installation tool includes a body, a first channel, and a first cavity. The first channel is defined in the body and configured to retain a first insulating tubing of the splice kit. The first cavity is within the first channel and configured to retain a first connector of the splice kit. The body is configured to retain the first insulating tubing and the first connector in a predetermined formation during installation of the first insulating tubing and the first connector to the heating cable, and the body is further configured to be removed from the first insulating tubing and the first connector following installation of the first insulating tubing and the first connector to the heating cable.

20 Claims, 13 Drawing Sheets

(51) Int. Cl.
*H01R 4/72* (2006.01)
*H02G 1/14* (2006.01)
*H05B 3/06* (2006.01)
*H05B 3/56* (2006.01)

(56) References Cited

U.S. PATENT DOCUMENTS

| | | | |
|---|---|---|---|
| 4,409,713 | A | 10/1983 | Johnston |
| 4,739,155 | A | 4/1988 | Rodgers et al. |
| 5,477,507 | A | 12/1995 | Kaplan |
| 5,817,978 | A | 10/1998 | Hermant et al. |
| 7,510,339 | B2 | 3/2009 | Burwell et al. |
| 7,919,733 | B2 | 4/2011 | Ellis et al. |
| 9,780,541 | B1 | 10/2017 | Stein |
| 10,348,073 | B2 | 7/2019 | Harwath |
| 10,361,551 | B2 | 7/2019 | Heise |
| 10,760,608 | B2 | 9/2020 | Diniz et al. |
| 2002/0044749 | A1* | 4/2002 | Koike ............... B29C 45/0053 385/95 |
| 2012/0080419 | A1 | 4/2012 | Bush et al. |
| 2017/0054261 | A1 | 2/2017 | Muja et al. |
| 2018/0076603 | A1 | 3/2018 | Harwath |

FOREIGN PATENT DOCUMENTS

| | | |
|---|---|---|
| CN | 201181825 Y | 1/2009 |
| CN | 202979330 U | 6/2013 |
| CN | 107613592 A | 1/2018 |
| CN | 208273283 U | 12/2018 |
| CN | 110544906 A | 12/2019 |
| DE | 29714679 U1 | 10/1997 |
| DE | 20308502 U1 | 9/2003 |
| EP | 0505911 B1 | 9/1992 |
| EP | 0624920 B1 | 11/1994 |
| EP | 2839543 A1 | 2/2015 |
| FR | 2984026 A1 | 6/2013 |
| JP | 2001215340 A | 8/2001 |
| KR | 101775787 B1 | 4/2017 |
| KR | 101847008 B1 | 4/2018 |
| WO | 2019197640 A1 | 10/2019 |

OTHER PUBLICATIONS

QuintEx Electrical Trace Heating, product catalog, Quintex GmbH, dated Aug. 15, 2012, 90 pages.
Chromalox Splice & Tee Kit fo rSelf-Regulating Cable, screen shot of catalog page, Spirax-Sarco Engineering, obtained from the internet May 13, 2021.
KSR-SK-DB In-Line Splice Kit KSR Snow Melting Cable installation procedures, Thermon . . . The Heating Specialists®, undated. 6 pages.
NVent RAYCHEM Heat-Shrink Under Insulation In-Line Splice Kit, spec sheet, Copyright 2019 nVent, 2 pages.

* cited by examiner

DEVICES AND METHODS FOR INSTALLATION TOOLS FOR USE WITH SPLICE KITS

RELATED APPLICATIONS

This application claims priority to U.S. Provisional Application No. 62/976,910, filed Feb. 14, 2020, which is incorporated by reference herein in its entirety.

BACKGROUND

During construction or repair of electrical systems, it may be necessary to join two cables together. Splice kits that utilize heat shrink tubing or cold shrink tubing can be used to join the two cables together. Splice kits generally need to electrically insulate the connection between the two cables, as well as provide a barrier against moisture.

Some splice kits can be used to electrically connect two heating cables together. Splice kits for heating cables may also need to meet certain safety standards such as temperature requirements and/or durability requirements. Some splice kits may require more technical expertise to install and/or may be more craft-intensive than other splice kits.

SUMMARY

The disclosure provides devices and methods for installation tools for splice kits. The installation tools can assist a technician in installing splice kits, such as splice kits for joining two heating cables together.

In one aspect, an installation tool for installing a splice kit for a heating cable is provided. The installation tool includes a body, a first channel, and a first cavity. The first channel is defined in the body and configured to retain a first insulating tubing of the splice kit, the first insulating tubing configured to receive a conductor of a first section of the heating cable therethrough. The first cavity is within the first channel and configured to retain a first connector of the splice kit, the first connector configured to electrically couple the conductor of the first section of the heating cable and a conductor a second section of the heating cable. The body is configured to retain the first insulating tubing and the first connector in a predetermined formation during installation of the first insulating tubing and the first connector to the heating cable, and the body is further configured to be removed from the first insulating tubing and the first connector following installation of the first insulating tubing and the first connector to the heating cable.

In another aspect, an installation system for a heating cable is provided. The installation system includes a splice kit and an installation tool. The splice kit includes a connector configured to electrically couple a first conductor and a second conductor of the heating cable, a first insulating tubing configured to receive the first conductor, and a second insulating tubing configured to receive the second conductor. The installation tool is configured to retain the connector, the first insulating tubing, and the second insulating tubing in a predetermined formation during installation of the connector, the first insulating tubing, and the second insulating tubing. The installation tool is further configured to be removed from the connector, the first insulating tubing, and the second insulating tubing following installation of the connector, the first insulating tubing, and the second insulating tubing.

In yet another aspect, a method of installing a splice kit on a heating cable is provided. The method includes retaining a first insulating tubing within a channel of an installation tool, retaining a second insulating tubing within the channel of the installation tool, and retaining a connector within the channel of the installation tool between the first insulating tubing and the second insulating tubing. The method also includes inserting a first conductor of the heating cable through the first insulating tubing into the connector and inserting a second conductor of the heating cable through the second insulating tubing into the connector. The method further includes tightening a bolt of the connector to electrically connect the first conductor to the second conductor.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1:
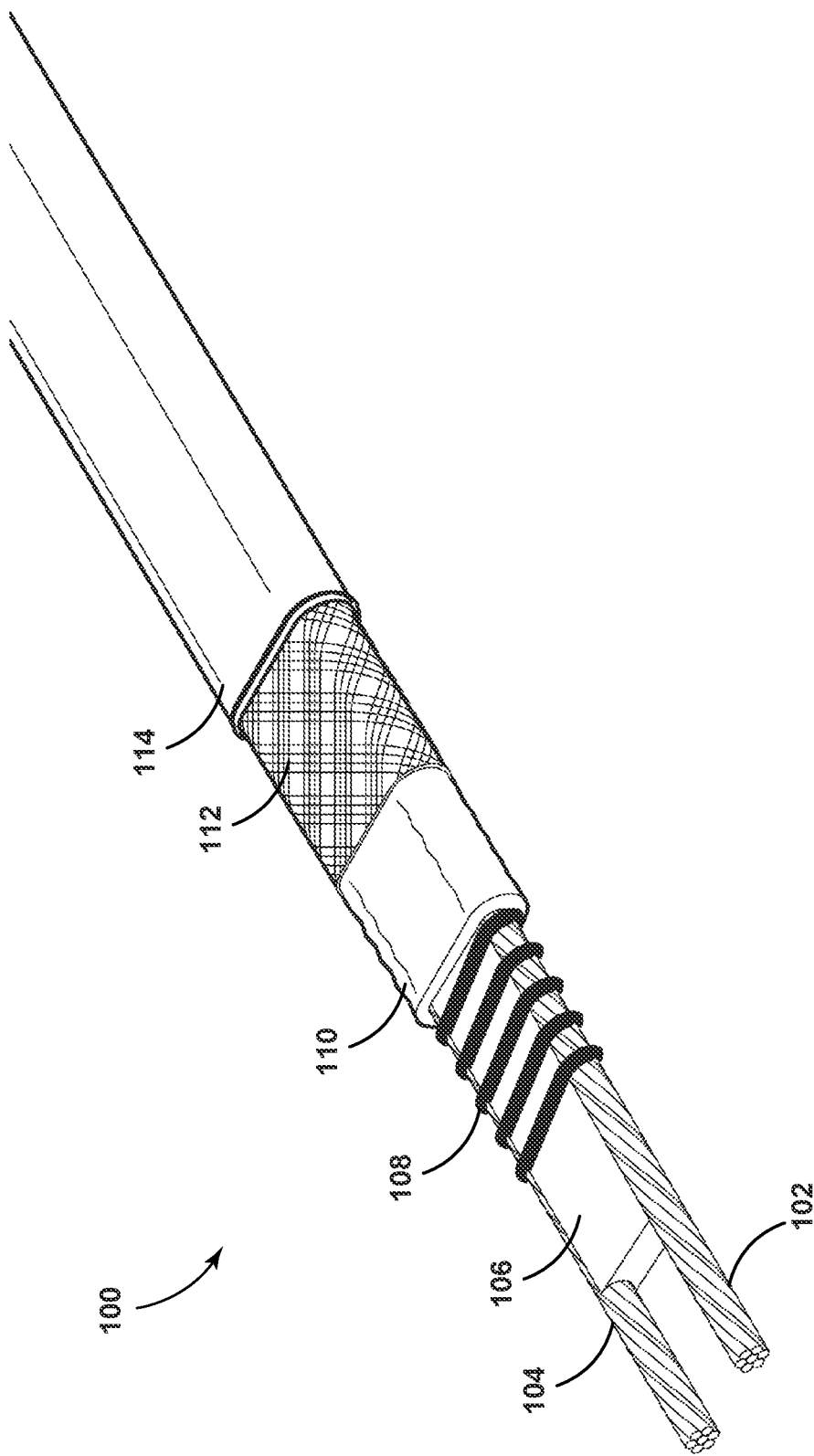
FIG. 1 is a heating cable for use with some embodiments of the invention.

FIG. 1 illustrates a heating cable 100 for use with some embodiments of the invention. For example, the heating cable 100 can be a fiber wrap heating cable such as an nVent Raychem KTV or XTV cable. The heating cable 100 can include two conductors 102, 104, which can be arranged in parallel, a spacer 106 arranged between the conductors 102, 104, a self-regulating heating element 108 wrapped around the conductors 102, 104 and the spacer 106, an inner jacket 110 around the heating element 108, and an outer jacket 114 around the inner jacket 110. The heating cable 100 can also include an optional braid 112 (that may be a metal braid)

between the inner jacket 110 and the outer jacket 114. The inner jacket 110 and the outer jacket 114 can each include a fluoropolymer.

Figure 2:
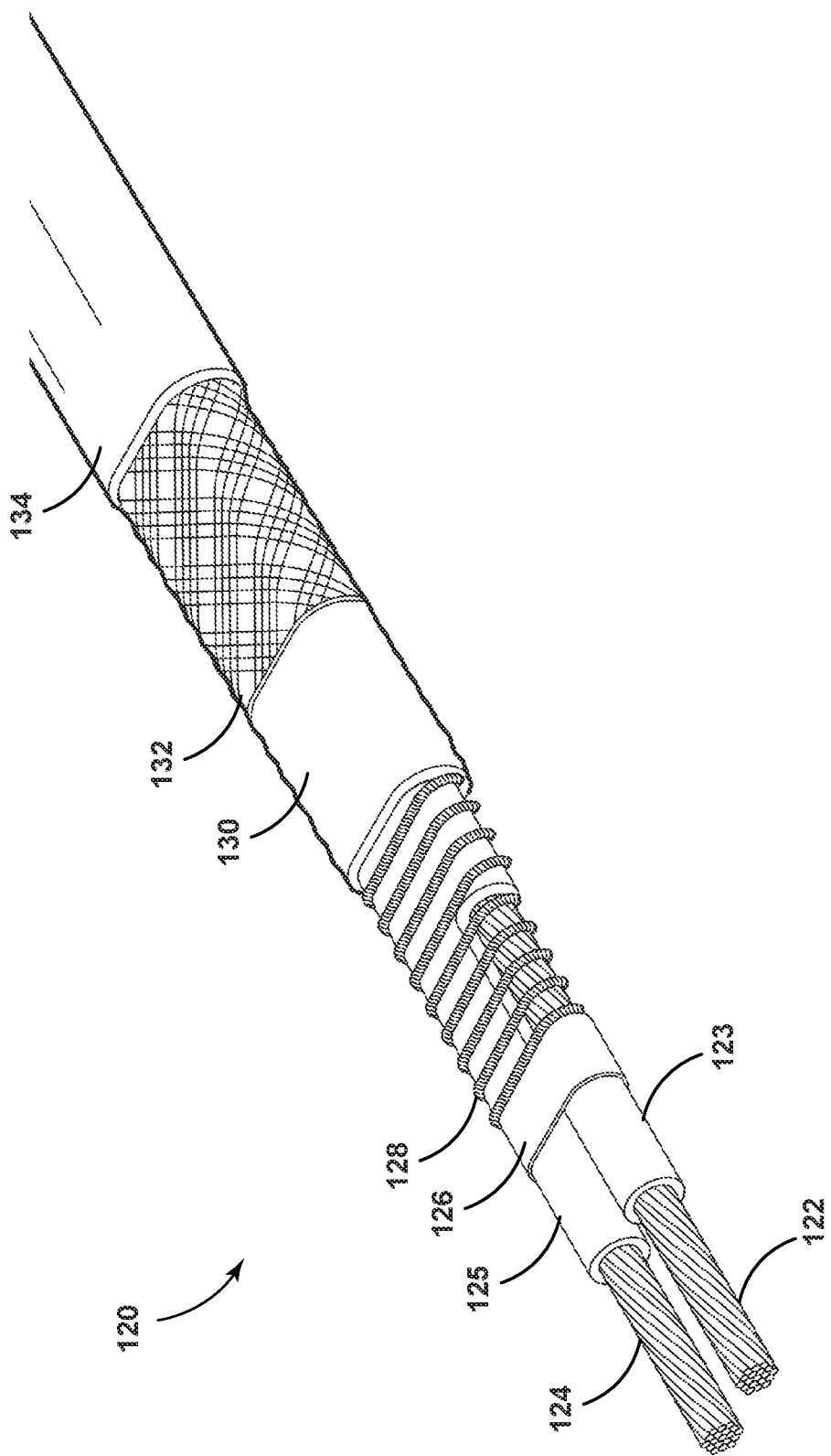
FIG. 2 is another heating cable for use with some embodiments of the invention.

FIG. 2 illustrates another heating cable 120 for use with some embodiments of the invention. For example, the heating cable 120 can be a power limiting heating cable such as an nVent Raychem VPL cable. The heating cable 120 can include two conductors 122, 124, which can be arranged in parallel, insulation layers 123, 125 around the two conductors 122, 124, a conductor jacket 126 around the conductors 122, 124, a power-limiting heating element 128 around the conductor jacket 126, an inner jacket 130 around the heating element 128, and an outer jacket 134 around the inner jacket 130. The heating cable 120 can also include an optional braid 132 (that may be a metal braid) between the inner jacket 130 and the outer jacket 134. The inner jacket 130 and the outer jacket 134 can each include a fluoropolymer.

Figure 3:
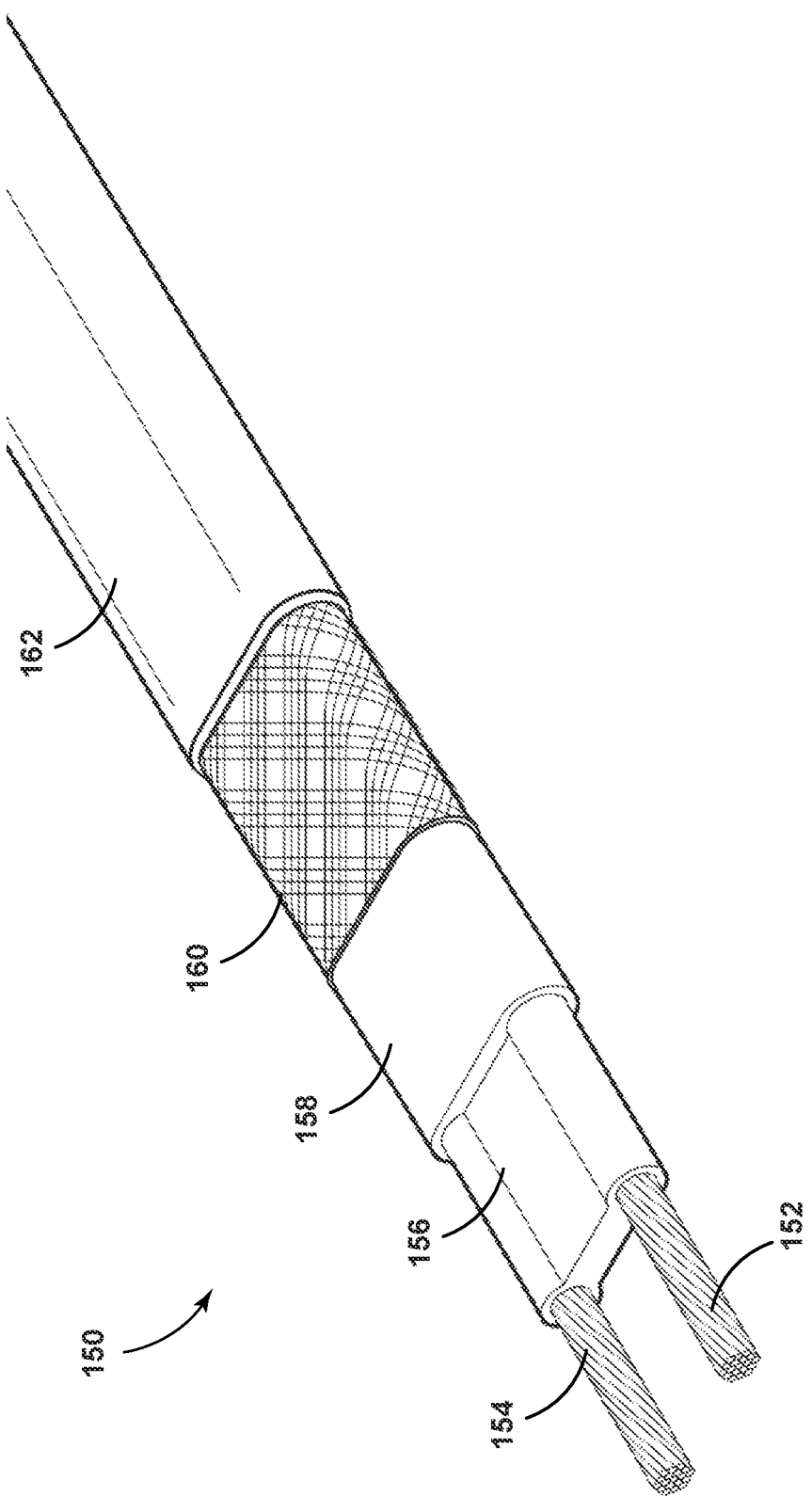
FIG. 3 is yet another heating cable for use with some embodiments of the invention.

FIG. 3 illustrates yet another heating cable 150 for use with some embodiments of the invention. For example, the heating cable 150 can be a monolithic heating cable such as an nVent Raychem BTV, QTVR, HBTV, or HQTV heating cable. The heating cable 150 can include two conductors 152, 154, which can be arranged in parallel, a self-regulating conductive core 156 surrounding and spacing apart the conductors 152, 154, an inner jacket 158 around the core 156, and an outer jacket 162 around the inner jacket 158. The heating cable 150 may also include an optional braid 160 between the inner jacket 158 and the outer jacket 162. The inner jacket 158 and the outer jacket 162 can each include a fluoropolymer or a modified polyolefin.

Figure 4A:
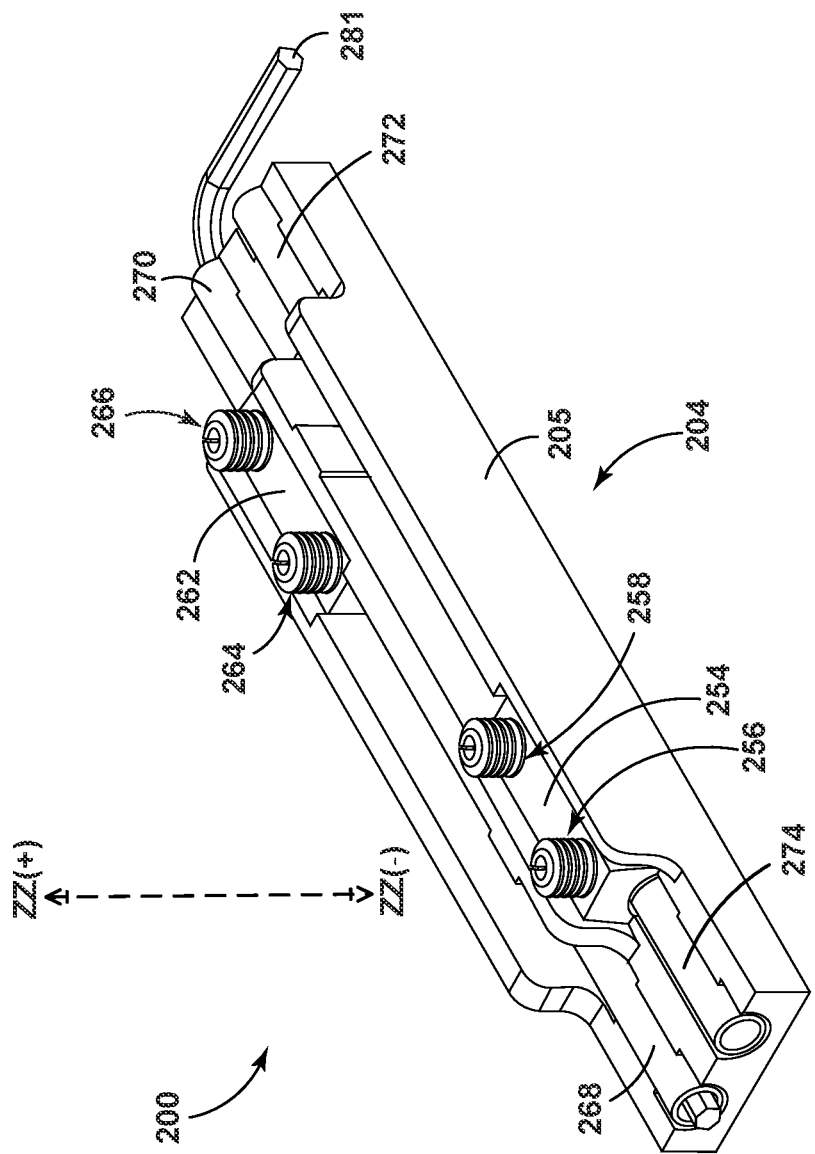
FIG. 4A is a front isometric view of an installation system, including a hex wrench, according to some embodiments of the invention.
Figure 4B:
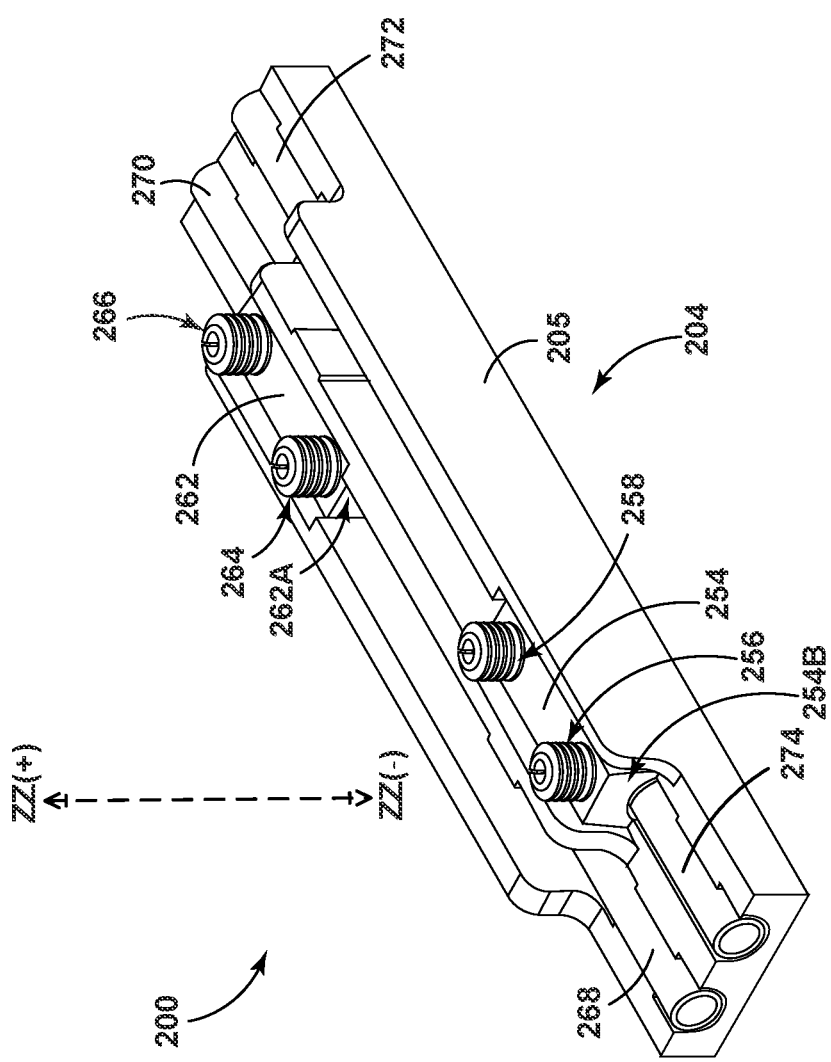
FIG. 4B is a front isometric view of the installation system of FIG. 4A not including the hex wrench.
Figure 4C:
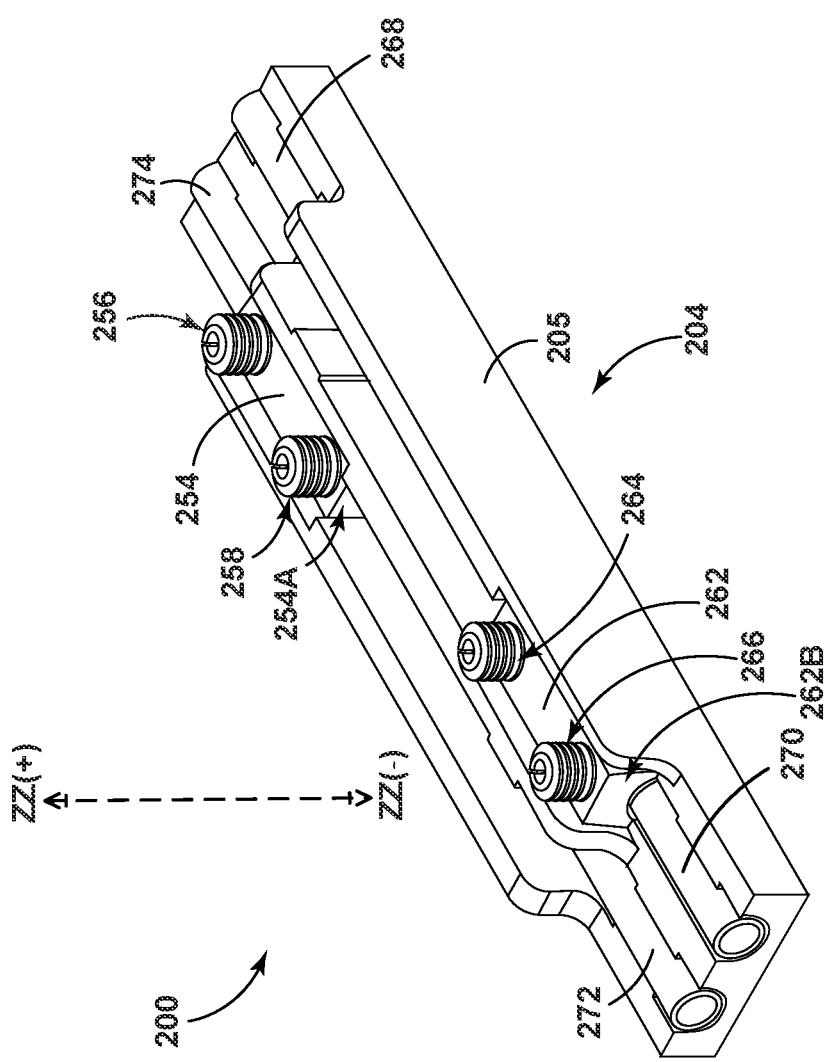
FIG. 4C is a rear isometric view of the installation system of FIG. 4A not including the hex wrench.

The heating cable 100 in FIG. 1, the heating cable 120 in FIG. 2, and/or the heating cable 150 in FIG. 3 can be used with one or more embodiments of an installation system as described herein. Other heating cables that can be used with embodiments of the installation system can include cables having one, or two or more parallel conductor or bus wires requiring insulating parts between two or more electrical terminals. For example, FIGS. 4A-C illustrate an installation system 200 including an installation tool 204 and a splice kit 250 according to some embodiments of the invention. The installation system 200 can be used to install at least a portion of the splice kit 250, and the splice kit 250 can be used to join together two segments of a heating cable.

More specifically, FIGS. 4A-7 illustrate the installation tool 204 of the system 200, for use with installing the splice kit 250, according to some embodiments of the invention. The installation tool 204 can retain or "caddy" components included in the splice kit 250 during installation. That is, the installation tool 204 can retain certain components of the splice kit 250 in an arrangement (e.g., a "predetermined formation") suitable for electrically coupling two segments of a cable (e.g., the heating cable 100 in FIG. 1, the heating cable 120 in FIG. 2, or the heating cable 150 in FIG. 3) as well as electrically insulating conductors included in the cable. When splicing a first segment of cable with a second segment of cable, the conductors (e.g., the conductors 102, 104 in FIG. 1 or the conductors 122, 124 in FIG. 2) need to be electrically coupled together. As will be described in detail below, the splice kit 250 can include suitable connectors and insulation for electrically coupling the conductors of the two segments of cable as well as electrically insulating the conductors from each other. The installation tool 204 can be used to install at least a portion of the components included in the splice kit 250, but may not be included in the installed splice kit 250. That is, after the components of the splice kit 250 are installed, the installation tool 204 can be removed and discarded or reused to install another splice kit using additional connectors and tubing.

Referring now to the splice kit 250, in some embodiments, the splice kit 250 can include a first connector 262, a second connector 254, a first conductor primary tubing 268, a first conductor secondary tubing 270, a second conductor primary tubing 272, and a second conductor secondary tubing 274. The splice kit 250 can also include a heat shrink tubing (not shown). Depending on the type of connector used for the first connector 262 and/or the second connector 254, the installation system 200 can also include a tool for installing the first connector 262 and/or the second connector 254. For example, as shown in FIG. 4A, the installation system 200 can include a hex wrench 281, which may also be referred to as an Allen wrench, a hex key, or an Allen key.

The first conductor primary tubing 268, the first conductor secondary tubing 270, the second conductor primary tubing 272, and the second conductor secondary tubing 274 can include electrically insulating materials such as certain plastics, and can electrically insulate conductor cables. The first conductor primary tubing 268, the first conductor secondary tubing 270, the second conductor primary tubing 272, and the second conductor secondary tubing 274 can be rated for temperatures up to 260° C. or higher. The first conductor primary tubing 268, the first conductor secondary tubing 270, the second conductor primary tubing 272, and the second conductor secondary tubing 274 can be formed using an extrusion process.

The first connector 262 and the second connector 254 can each be shear bolt connectors, including one or more shear bolts or set screws. As shown, the connectors 262, 254 can be used to electrically couple together individual conductors of two-conductor heating cable segments. For example, the first connector 262 can include a first shear bolt 264 that can couple a first conductor (e.g., of a first segment of heating cable) to the first connector 262, and a second shear bolt 266 that can couple a second conductor (e.g., of a second segment of heating cable) to the first connector 262. That is, the first conductor can be inserted through the first conductor primary tubing 268 into the first connector 262, and the second conductor can be inserted through the first conductor secondary tubing 270 into the first connector 262. The hex wrench 281 can then engage each of the first shear bolt 264 and the second shear bolt 266. That is, a technician can use the hex wrench 281 (or another suitable wrench not included in the installation system 200) to tighten the shear bolts 264, 266 against the conductors within the first connector 262 and electrically couple the two conductors together. In some embodiments, the first shear bolt 264 and the second shear bolt 266 can be set screws.

Additionally, the second connector 254 can include a first shear bolt 256 that can couple a first conductor (e.g., of the second segment of heating cable) to the second connector 254, and a second shear bolt 258 that can couple a second conductor (e.g., of the first segment of heating cable) to the second connector 254. The first conductor can be inserted through the second conductor primary tubing 272 into the second connector 254, and the second conductor can be inserted through the second conductor secondary tubing 274 into the second connector 254. The hex wrench 281 can then engage each of the first shear bolt 256 and the second shear bolt 258. That is, a technician can use the hex wrench 281 (or another suitable hex wrench not included in the installation system 200) to tighten the shear bolts 256, 258 against the conductors within the second connector 254 and electrically coupled the two conductors together. In some embodiments, the first shear bolt 264 and the second shear bolt 266 can be set screws.

In some embodiments, the first connector 262 and second connector 254 can be can be rated for temperatures up to 260° C. or higher. As mentioned above, the tubings 268-274 can also be rated for 260° C. or higher. Additionally, if an appropriate heat shrink is included in the splice kit 250, splice kit 250 can be rated for use in temperatures up to 260° C.

In some embodiments, the hex wrench 281 can be included in the installation system 200 without significantly expanding the footprint of the installation system 200. In some embodiments, a portion of the hex wrench 281 can be stored in the first conductor primary tubing 268, the first conductor secondary tubing 270, and/or the first connector 262. Furthermore, in some embodiments, a majority of the hex wrench 281 can be stored in the first conductor primary tubing 268, the first conductor secondary tubing 270, and the first connector 262 prior to installation of the splice kit 250.

Referring now to the installation tool 204, in some embodiments, the installation tool 204 can hold or retain the first connector 262, the second connector 254, the first conductor primary tubing 268, the first conductor secondary tubing 270, the second conductor primary tubing 272, and the second conductor secondary tubing 274 in place rigidly enough to allow for a technician to install the connectors 254, 262 and the tubings 268, 270, 272, 274 on the cable segments. At the same time, the installation tool 204 can have enough flexibility to allow the technician to remove the installed connectors 254, 262 and the tubings 268, 270, 272, 274.

The installation tool 204 can include a body 205 formed from an electrically insulating material with properties, such as (or similar to) a hard, unreinforced plastic or other relatively rigid yet elastically deformable material. For example, in some embodiments, the installation tool 204 and, more specifically, the body 205 can be formed entirely from injection molded nylon. In other embodiments, the installation tool 204 may be formed from plastics other than nylon. The installation tool 204 can retain the connectors 254, 262 and the tubings 268, 270, 272, 274 in place to prevent against displacement potentially caused by insertion of conductor wires into the tubings 268, 270, 272, 274 and/or the connectors 254, 262, or potentially caused by turning of the shear bolts 256, 258. The installation tool 204 can be flexible enough along a ZZ axis, and more specifically along the ZZ axis in the negative direction (i.e., the direction along which the shear bolts 256, 258 are driven), to allow the installation tool 204 to be removed and/or or peeled off downwardly after the connectors 254, 262 and the tubings 268, 270, 272, 274 are installed. For example, the cable that the connectors 254, 262 and the tubings 268, 270, 272, 274 are installed on can be pulled upward (i.e., in a positive direction along the ZZ axis) and/or the installation tool 204 can be pulled downward (i.e., in the negative direction along the ZZ axis) to remove the installation tool 204 from the installed cable. Sides of the body 205, such as side 229 (shown in FIG. 5A), may flex outward along the YY axis to allow the connectors 254, 262 to be removed. The installation tool 204 may be flexible the ZZ direction, but stiff enough to prevent rotation around the ZZ axis near a bottom 231 of the installation tool 204.

As noted above, the installation tool 204 can assist a technician in installing the splice kit 250 by keeping the first connector 262, the second connector 254, the first conductor primary tubing 268, the first conductor secondary tubing 270, the second conductor primary tubing 272, and the second conductor secondary tubing 274 in a predetermined formation required to properly install the splice kit 250, which can make installation easier as compared to if the retained components were loose. The predetermined formation can vary based on the dimensions of the components included in the splice kit. The installation tool 204 can retain the first connector 262, the second connector 254, the first conductor primary tubing 268, the first conductor secondary tubing 270, the second conductor primary tubing 272, and the second conductor secondary tubing 274 throughout installation.

Furthermore, the installation tool 204 can be especially helpful if the first connector 262, the second connector 254, the first conductor primary tubing 268, the first conductor secondary tubing 270, the second conductor primary tubing 272, and the second conductor secondary tubing 274 are relatively small. For example, in some embodiments, each of the first connector 262 and the second connector 254 are approximately 15 mm long by 7 mm high by 5.5 mm wide, each of the first conductor secondary tubing 270 and the second conductor secondary tubing 274 are approximately 12 mm long with a 3.5 mm outer diameter, and each of the first conductor primary tubing 268 and the second conductor primary tubing 272 are approximately 44 mm long with a 3.5 mm outer diameter. Thus, the connectors 254, 262 and/or the tubings 268, 270, 272, 274 may be difficult to handle for certain workers if loose (e.g., not retained by the installation tool 204).

FIGS. 4A-C and FIGS. 5A-5B illustrate the installation tool 204 in an installation position (e.g., not deformed by a user and retaining the components of the splice kit 250). The body 205 can be a single piece construction, formed by, for example, injection molding. The installation tool 204 does not need to meet any of the ratings or standards required of the splice kit 250, which may include a temperature rating, a mechanical stress rating, and/or voltage rating. In some embodiments, the installation tool 204 also does not need to provide any protection such as electrical insulation, moisture protection, and/or impact protection (e.g., cold impact protection) to the splice kit 250. In some embodiments, the installation tool 204 may be formed from an electrically insulating material to remove the risk of the installation tool 204 acting as a conductor if the installation tool 204 were ever in contact with live power, but is not necessary. Furthermore, in some embodiments, the splice kit 250 can be rated for a temperature rating and/or a cold impact rating, and the installation tool 204 is not rated for either the temperature rating or the cold impact rating. Because the installation tool 204 does not need to meet the above ratings and/or standards, or provide any of the protections listed above, the installation tool 204 can be formed using a variety of different manufacturing techniques and/or materials, which can allow the installation tool 204 to be produced for a low cost.

As shown in FIGS. 4A-7, the installation tool 204 can include ridges, lips, protrusions, and other features configured to retain components of the splice kit 250, not including the heat shrink tubing, throughout the installation of the retained components. For example, in some embodiments, the body 205 can define a first channel 276 and a second channel 278. As such, the body 205 can be configured to retain the first connector 262, the second connector 254, the first conductor primary tubing 268, the first conductor secondary tubing 270, the second conductor primary tubing 272, and/or the second conductor secondary tubing 274 in respective channels 276, 278, or other openings in the installation tool 204. Furthermore, within each channel 276, 278, the installation tool 204 can include a cavity 280, 282 configured to receive the second connector 254 and the first connector 262, respectively. Accordingly, the installation tool 204 described and illustrated herein, containing two parallel channels 276, 278, is configured to accommodate splicing together cables having two parallel conductors. Thus, the channels 276, 278 can be spaced apart a distance equal or similar to a spacing between conductors of a cable.

Figure 5A:
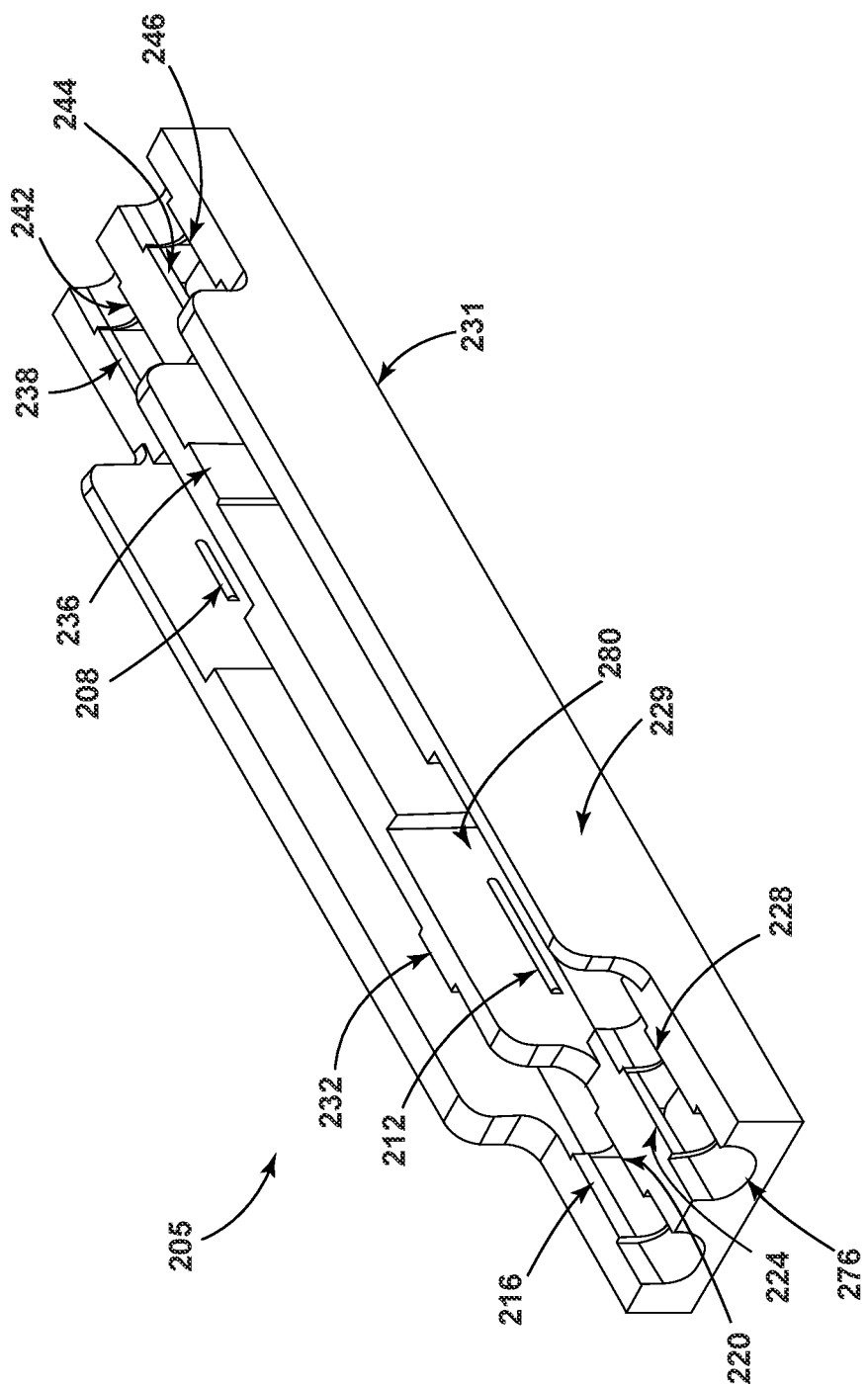
FIG. 5A is a front isometric view of an installation tool according to some embodiments of the invention.
Figure 5B:
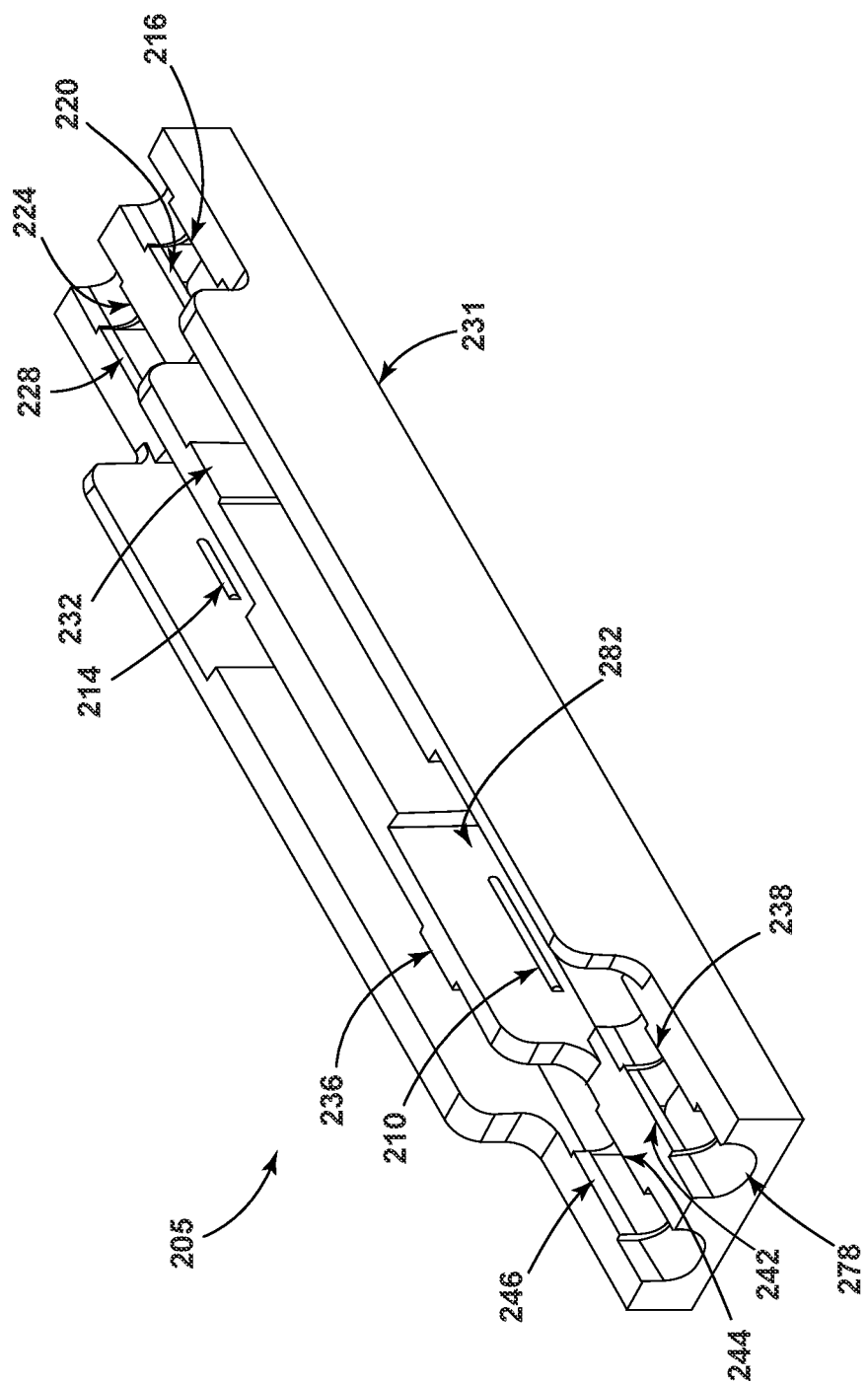
FIG. 5B is a rear isometric view of the installation tool of FIG. 5A.

In some embodiments, as shown in FIGS. 5A-5B, the installation tool 204 can include an exterior retainer 208 and an interior retainer 210 that can retain the first connector 262 within the first cavity 282. Each of the exterior retainer 208 and the interior retainer 210 be a protrusion that extends from walls of the first cavity 282 inward towards the first connector 262. In some embodiments, the interior retainer 210 and the exterior retainer 208 can be the same shape and size. The interior retainer 210 and the exterior retainer 208 can apply opposing forces to the sides of the first connector 262 in order to maintain the first connector 262 within the first cavity 282. The forces can be applied at an angle approximately orthogonal to the surface of the sides of the first connector 262.

In some embodiments, as shown in FIGS. 5A-5B, the installation tool 204 and, in particular, a second cavity 280, can include a second interior retainer 212 and a second exterior retainer 214 that can retain the second connector 254 within the second cavity 280. Each of the second interior retainer 212 and the second exterior retainer 214 can be a protrusion that extends from walls of the second cavity 280 inward towards the second connector 254. In some embodiments, the second interior retainer 212 and the second exterior retainer 214 can be the same shape and size. The second interior retainer 212 and the second exterior retainer 214 can apply opposing forces to the sides of the second connector 254 in order to maintain the second connector 254 within the second cavity 280. The forces can be applied at an angle approximately orthogonal to the surface of the sides of the second connector 254.

Furthermore, as shown in FIGS. 5A-5B, the installation tool 204 can include a first tubing retainer 216 and a second tubing retainer 220 that can retain the first conductor primary tubing 268 within the channel 278. The first tubing retainer 216 and the second tubing retainer 220 can be opposing lips that extend inward towards each other and over at least a portion of the first conductor primary tubing 268 when the first conductor primary tubing 268 is positioned within the channel 278. The first tubing retainer 216 and the second tubing retainer 220 can radially extend over enough of the first conductor primary tubing 268 to retain the first conductor primary tubing 268 in the installation position, while also allowing the installation tool 204 to be removed from the first conductor primary tubing 268 after installation of components included in the splice kit 250 that are retained by the installation tool. For example, the first tubing retain 216, the second tubing retainer 220 (and/or portions of the channel 278) may radially border about one hundred and ninety degrees to about two-hundred and forty degrees of an outer surface of the first conductor primary tubing 268. In other words, the installation tool 204 can impinge on a majority of the outer surface of the first conductor primary tubing 268 at the first tubing retainer 216 and the second tubing retainer 220. Additionally, as shown in FIGS. 4A-4C, the outer surface of the first conductor primary tubing 268 may be curved. The first tubing retainer 216 and the second tubing retainer 220 can be flush with at least a portion of the outer surface of the first conductor primary tubing 268. Furthermore, while the first tubing retainer 216 and the second tubing retainer 220 are described as separate components, in some embodiments, they may form a single radial retainer extending around and/or outside of the channel 276.

The installation tool 204 can include a number of additional tubing retainers that can retain tubing other than the first conductor primary tubing 268 in a similar manner as described above with respect to the first conductor primary tubing 268. More specifically, the installation tool 204 can include a third tubing retainer 224 and a fourth tubing retainer 228 that can be substantially the same size and shape as the second tubing retainer 220 and the first tubing retainer 216, respectively. The third tubing retainer 224 and the fourth tubing retainer 228 can retain the second conductor secondary tubing 274. The installation tool 204 can include a fifth tubing retainer 238 and a sixth tubing retainer 242 that can be substantially the same size and shape as the first tubing retainer 216 and the second tubing retainer 220, respectively. The fifth tubing retainer 238 and the sixth tubing retainer 242 can retain the second conductor secondary tubing 274. The installation tool 204 can include a seventh tubing retainer 244 and an eighth tubing retainer 246 that can be substantially the same size and shape as the second tubing retainer 220 and the first tubing retainer 216, respectively. The seventh tubing retainer 244 and the eighth tubing retainer 246 can retain the second conductor secondary tubing 274.

In some embodiments, the installation tool 204 can include any number of retainers configured to retain each tubing within a respective channel 276, 278, and some tubings may have more retainers than other tubings. For example, the installation tool 204 can include additional retainers that may assist in retaining longer lengths of tubing, such as the first conductor primary tubing 268 and the second conductor primary tubing 272. In some embodiments, as shown in FIG. 5A, the installation tool 204 can include a supplemental retainer 232 that can retain the first conductor primary tubing 268 in similar fashion as the second tubing retainer 220. The installation tool 204 can include another supplemental retainer 236 that can retain the second conductor primary tubing 272 in similar fashion as the seventh tubing retainer 244.

Figure 6:
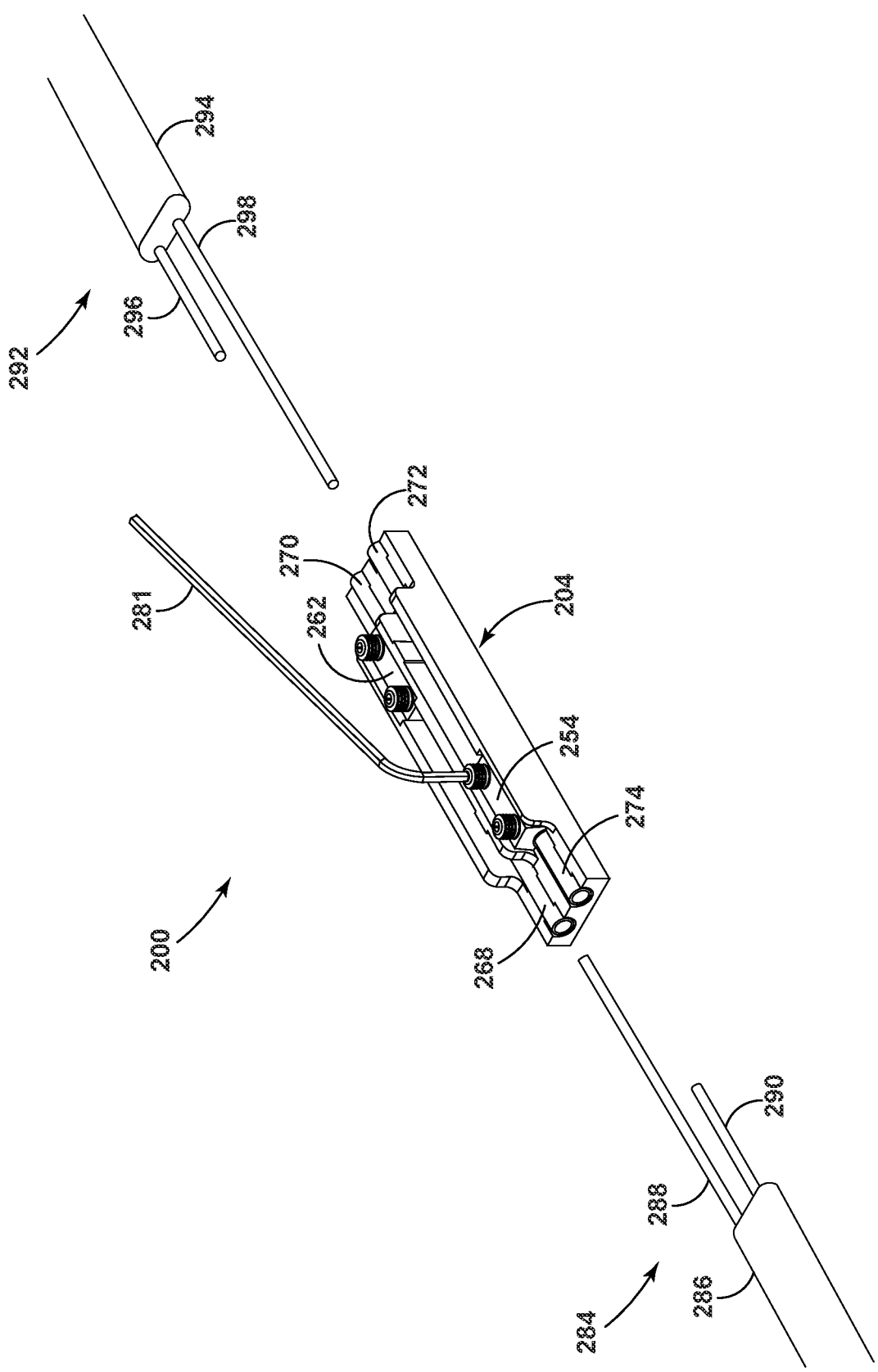
FIG. 6 is an isometric view of the installation system of FIG. 4A as well as two cable segments according to some embodiments of the invention.

Referring now to methods of installation, FIG. 6 illustrates a first cable segment 284 and a second cable segment 292, shown prior to insertion into the installation system 200 of FIGS. 4A-4C and FIGS. 5A-5B. The first cable segment 284 can be a segment of a heating cable, such as the heating cable 100 in FIG. 1, the heating cable 120 in FIG. 2, or the heating cable 150 in FIG. 3. For simplicity, the first cable segment 284 is shown with a primary jacket 286, a first conductor 288, and a second conductor 290. It is understood that the first cable segment 284 can include other layers and/or components of the heating cable 100 in FIG. 1, the heating cable 120 in FIG. 2, or the heating cable 150 in FIG. 3.

To initially set up the installation system 200, the first conductor tubing (e.g., the first conductor primary and secondary tubing 268, 270) can be retained within the channel 278, the second conductor tubing (e.g., the second conductor primary and secondary tubing 272, 274) can be retained within the channel 276, the first connector 262 can be retained within the cavity 282 (e.g., within the channel 278 between the first conductor primary and secondary tubing 268, 270), and the second connector 254 can be retained with the cavity 280 (e.g., within the channel 276 between the second conductor primary and secondary tubing 272, 274). Thus, the installation tool 204 can retain the first connector 262, the second connector 254, the first conductor primary tubing 268, the first conductor secondary tubing 270, the second conductor primary tubing 272, and the second conductor secondary tubing 274 in a predetermined formation required to properly install the splice kit 250. For example, in some embodiments, in the predetermined formation, the first conductor primary tubing 268 can abut a first end 262A of the first connector 262 (shown in FIG. 4B), the first conductor secondary tubing 270 can abut a second end 262B of the first connector 262 (shown in FIG. 4C), the second conductor primary tubing 272 can abut a first end 254A of the second connector 254 (shown in FIG. 4C), and the second conductor secondary tubing 274 can abut a second end 254B of the second connector 254 (shown in FIG. 4B).

In addition to setting up the installation system 200, the first cable segment 284, and the second cable segment 292 can be prepared for splicing. For example, the first conductor 288 and the second conductor 290 included in the first cable segment 284 can be exposed (i.e., any surrounding layers removed) and cut to predetermined lengths. The exposed portion of the first conductor 288 can be long enough to be inserted through the first conductor primary tubing 268 and far enough into the first connector 262 to be electrically coupled to the first connector 262, with as little of the first conductor 288 exposed between the primary jacket 286 and the first conductor primary tubing 268 as possible. However, a small amount of the first conductor 288 may be exposed between the primary jacket 286 and the first conductor primary tubing 268. Similarly, the exposed portion of the second conductor 290 can be long enough to be inserted through the second conductor secondary tubing 274 and far enough into the second connector 254 to be electrically coupled to the second connector 254, with as little of the second conductor 290 exposed between the primary jacket 286 and the second conductor secondary tubing 274 as possible. Accordingly, in some embodiments, a predetermined length of the primary jacket 286 can be exposed (i.e., have no surrounding layers), extending from proximal ends of the first conductor 288 and the second conductor 290. The predetermined length can vary based on cable type and/or the type of heat shrink tubing or other covering included in the splice kit 250.

As further shown in FIG. 6, a first conductor 296 and a second conductor 298 of the second cable segment 292 can be exposed (i.e., any surrounding layers removed) and cut to predetermined lengths. The exposed portion of the first conductor 296 can be long enough to be inserted through the first conductor secondary tubing 270 and far enough into the first connector 262 to be electrically coupled to the first connector 262, with as little of the first conductor 296 exposed between the primary jacket 294 and the first conductor secondary tubing 270 as possible. However, a small amount of the first conductor 296 may be exposed between the primary jacket 294 and the first conductor secondary tubing 270. Similarly, the exposed portion of the second conductor 298 can be long enough to be inserted through the second conductor primary tubing 272 and far enough into the second connector 254 to be electrically coupled to the second connector 254, with as little of the second conductor 298 exposed between the primary jacket 294 and the second conductor primary tubing 272 as possible. Accordingly, a predetermined length of the primary jacket 294 can be exposed (i.e., have no surrounding layers), extending from the proximal ends of the first conductor 296 and the second conductor 298. The predetermined length can vary based on cable type and/or the type of heat shrink tubing or other covering included in the splice kit 250.

Once the conductors 288, 290, 296, 298 are inserted through the respective conductor tubing 268, 270, 272, 274 into a respective connector 254, 262, the shear bolts 256, 258, 266, 264 of the connectors 254, 262 can be tightened in order to electrically connect the conductors 288, 290, 296, 298 to the connector 254, 262. That is, once the shear bolts 256, 258 are tightened, the conductors 290, 298 are electrically connected, and once the shear bolts 266, 264 are tightened, the conductors 288, 296 are coupled together.

As mentioned above, the installation tool 204 can retain the first connector 262, the second connector 254, the first conductor primary tubing 268, the first conductor secondary tubing 270, the second conductor primary tubing 272, and the second conductor secondary tubing 274 in a predetermined formation required to properly install the splice kit 250. In this way, a worker can electrically couple the first conductor 288 of the first cable segment 284 to the first conductor 296 of the second cable segment 292 (via the first connector 262) and electrically couple the second conductor 290 included in the first cable segment 284 to the second conductor 298 included in the second cable segment 292 (via the second connector 254), while also keeping the first conductor 288 of the first cable segment 284 and the first conductor 296 of the second cable segment 292 spaced apart and electrically insulated from the second conductor 290 of the first cable segment 284 and the second conductor 298 of the second cable segment 292, respectively.

Figure 7:
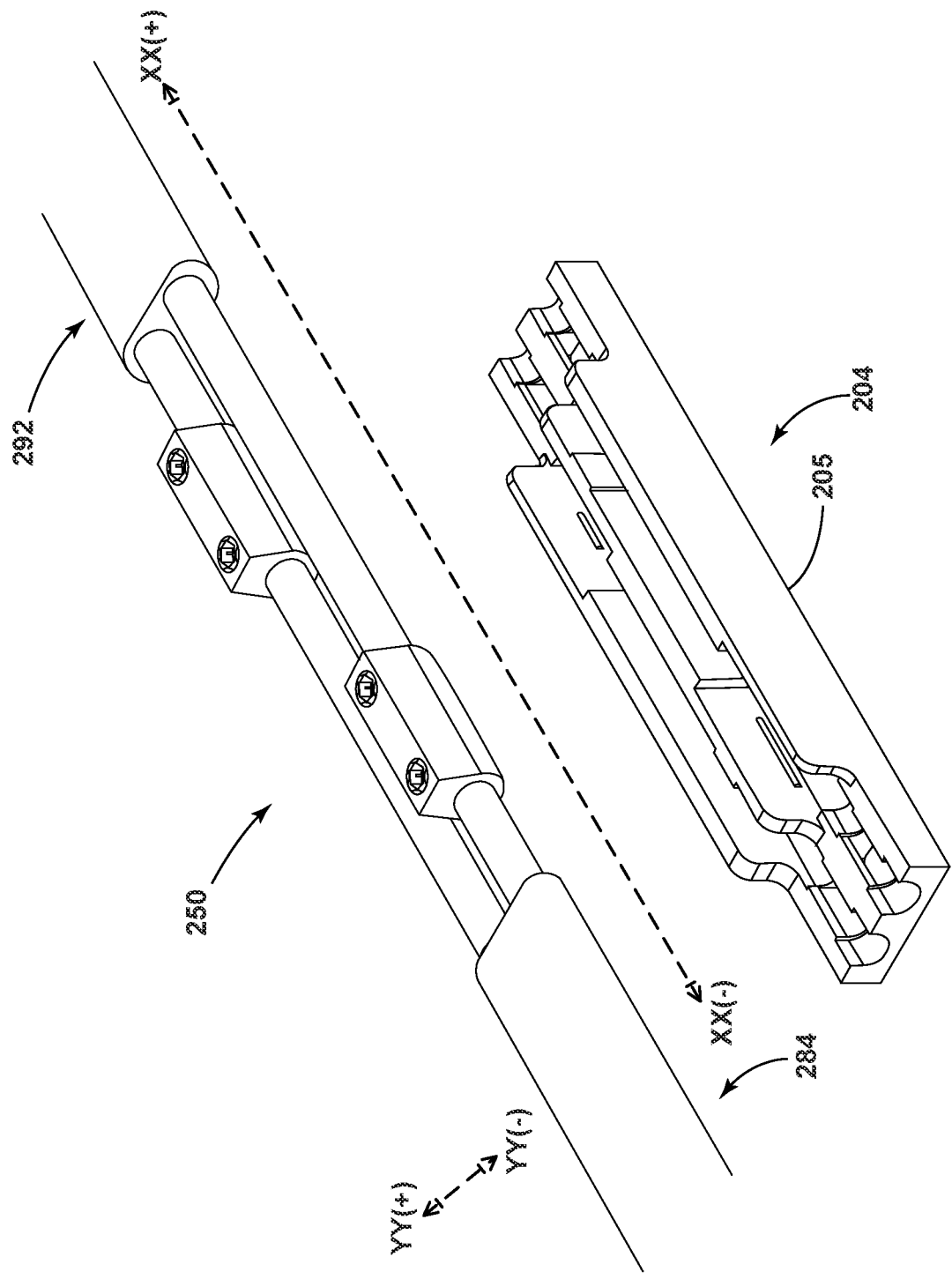
FIG. 7 is an isometric view of an installed portion of a splice kit according to some embodiments of the invention.

For example, FIG. 7 illustrates an isometric view of the installed splice kit 250 removed from the installation tool 204 of FIG. 6. In some embodiments, in the predetermined formation, the first connector 262 and the second connector 254 can be spaced apart along a length of the installation tool 204. More specifically, in the predetermined formation, the first connector 262 and the second connector 254 can be distanced apart along an XX axis such that, even if the connectors 262, 254 move along the YY axis in the positive direction, there will not be electrical contact between the first connector 262 and the second connector 254. The dedicated cavities 280, 282 of the installation tool 204 for the first connector 262 and the second connector 254 can ensure this spacing is maintained during installation. In other words, the first cavity 280 and the second cavity 282 can be positioned at different lengths along the first channel 276 and the second channel 278, respectively, so that they are not adjacent each other.

After the components of the splice kit 250 retained by the installation tool 204 are installed, and the installed components are removed from the installation tool 204, heat shrink tubing or another suitable covering can be placed over the installed components and shrunk. More specifically, the covering can be placed over the insulating tubings 268-274, the connectors 254, 262, and/or any remaining exposed portions of the conductors 288, 290, 296, 298, and shrunk. Thus, the installation tool 204 can assist in installing a high temperature (e.g., 260° C.) and potentially hard to handle splice kit at a low cost (e.g., because, as noted above, the installation tool 204 is not required to meet some, if not all, of the industry standards that the splice kit 250 is required to meet).

It is appreciated the installation tool 204 can be configured to include a number of connectors and/or tubings for splicing cables with more than two conductors. For cables with more than two conductors, the additional connectors can be displaced in stepwise fashion along the XX axis. For example, an additional connector (not shown) could be located further along the XX axis in the positive direction than the first connector 262. The tubings and features of the installation tool 204 can also be adjusted to accommodate the additional connector.

Additionally or alternatively, in some embodiments, the installation tool 204 may also be used to install a third connector (not shown) similar to the second connector 254 and the first connector 262 in order to join ground wires or cable braids twisted into wires (e.g., additional wires that may or may not need to be surrounded by heat shrink tubing). The third connector may be included as a loose part along with the installation tool 204 and the retained components of the splice kit 250. For example, after the installation tool 204 is removed from the retained components of the splice kit 250, and heat shrink tubing is installed over the previously retained components, the third connector may be installed into one of the cavities 280, 282 of the installation tool 204. The installation tool 204 can then retain the third connector as the ground wires or cable braids twisted into wires of the cables are joined. The hex wrench 281 may be used to help tighten shear bolts or set screws in the third connector.

Furthermore, in some embodiments, certain cables can be spliced using the installation tool 204 with or without the tubings 268-274. For example, certain cables, such as the cable 120 of FIG. 2 (e.g., an nVent Raychem VPL cable), have individual insulation 123, 125 on each conductor 122, 124. These cables 120 can be installed with the installation tool 204 using at least two different possible methods. A first example method is to strip the full lengths of insulation 123, 125 around the conductors 122, 124 to expose bare conductors 122, 124, trim the conductors 122, 124 to lengths, insert the conductors 122, 124 into the corresponding tubings 268-274, connect the conductors 122, 124 to the connectors 254, 262, and remove the installation tool 204 as described above. Another example method is to remove the insulating tubings 268-274 from the installation tool 204, remove only enough insulation 123, 125 from the conductors 122, 124 equal to an insertion length into the connectors 254, 262 (e.g., six millimeters for certain connectors), insert the exposed or uninsulated portion of the conductors 122, 124 into the connectors 254, 262, tighten the connectors 254, 262, and remove the installation tool 204. The connectors 254, 262 and the exposed insulated sections 123, 125 may then be covered by heat shrink tubing. Thus, the installation tool 204 may retain only the connectors 254, 262 during installation of these types of cables 120 in some embodiments.

Figure 8:
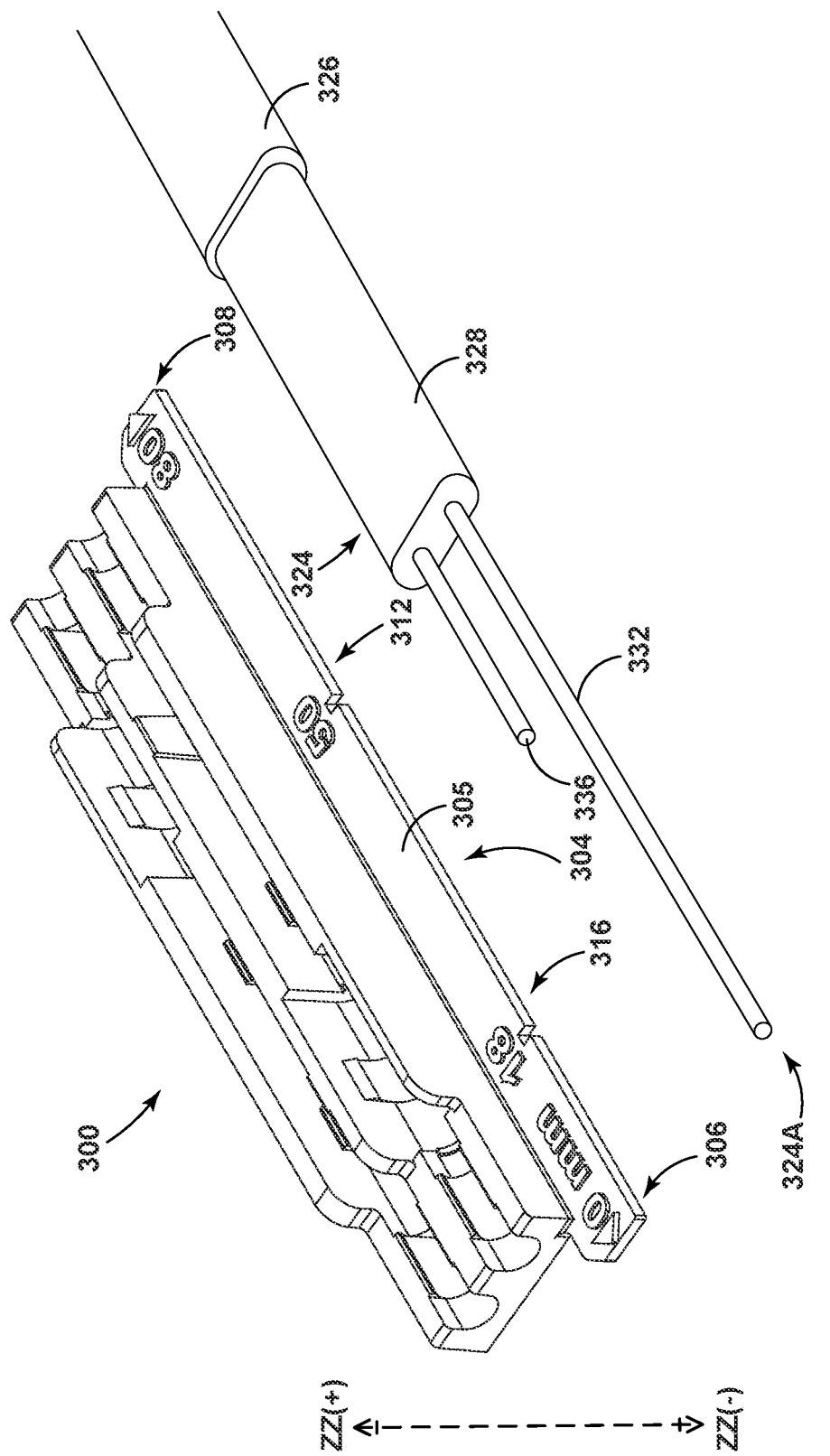
FIG. 8 is an isometric view of another installation tool according to some embodiments of the invention.
Figure 9:
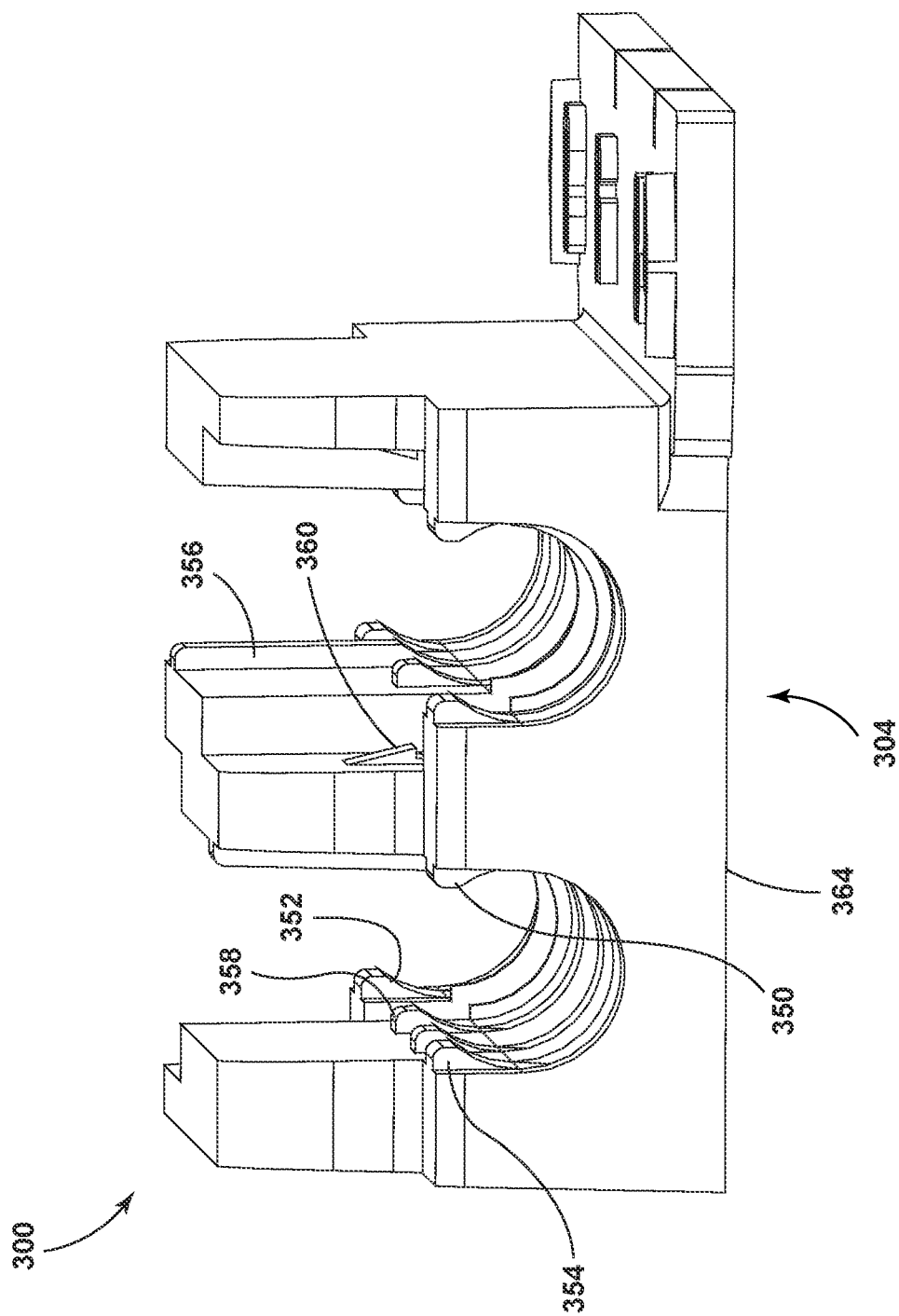
FIG. 9 is another isometric view of the installation tool of FIG. 8.
Figure 10:
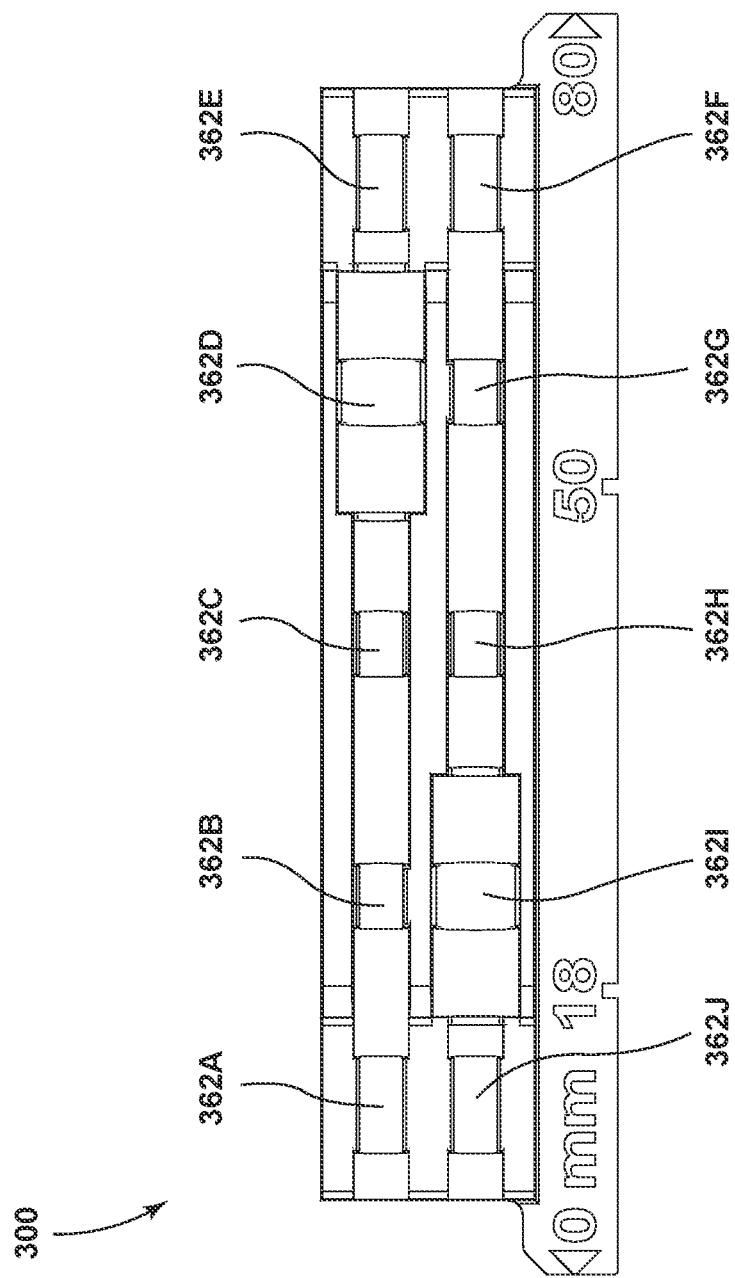
FIG. 10 is a top plan view of the installation tool of FIG. 8.

FIGS. 8-10 illustrate another installation tool 300 according to some embodiments of the invention. The installation tool 300 can implement at least some of the functionality and/or physical features of the installation tool 204 described above. In some embodiments, the installation tool 300 can retain the first connector 262, the second connector 254, the first conductor primary tubing 268, the first conductor secondary tubing 270, the second conductor primary tubing 272, and the second conductor secondary tubing 274 as described above and, thus, similar features will not be further described herein for brevity purposes. The installation tool 300 can be formed using an injection molding technique.

As shown in FIG. 8, the installation tool 300 can also include a wire stripping guide 304. For example, the wire stripping guide 304 may be part of the one-piece body 305 or may be a separate piece permanently or removably coupled to the body 305. The wire stripping guide 304 can include one or more indicators such as alphanumerical markings (molded and/or painted), non-alphanumeric marking such as notches, shapes such as triangles and/or arrows, or other suitable indicators that can assist a technician in preparing a cable for installation of splice kit components retained by the installation tool 300. An exemplary cable 324 including an outer jacket 326, a primary jacket 328, a first conductor 332, and a second conductor 336 is also shown in FIG. 8.

In one embodiment, as shown in FIG. 8, the installation guide 304 can include a first indicator 306 that can indicate a position to place a cut end 324A of the cable 324. The first indicator 306 can indicate a position to begin removing cable layers from the conductors 332, 336, such as the outer jacket 326, the primary jacket 328, and any other layers included in the cable 324. The installation guide 304 can further include a second indicator 308 that can indicate the length of the outer jacket 326 to remove (e.g., the length extending from the first indicator 306 to the second indicator 308).

The installation guide 304 can include a third indicator 312 positioned between the first indicator 306 and the second indicator 308. The third indicator 312 can indicate a length of the primary jacket 328 (and any other layers that surround the conductors 332, 336) to remove from the first conductor 332 and the second conductor 336 (e.g., the length extending from the first indicator 306 to the third indicator 312). Thus, an installer can align the cut end 324A of the cable 324 with the first indicator 306, then use the third indicator 312 as a guide to remove all layers surrounding the conductors 332, 336 (e.g., from the first indicator 306 to the third indicator 312), and use the second indicator 308 as a guide to further remove all layers surrounding the primary jacket 328 (e.g., from the third indicator 312 to the second indicator 308).

In some embodiments, the installation guide 304 can also include a fourth indicator 316 to indicate a length at which to cut the second conductor 336. More specifically, the proximal ends of the exposed conductors 332, 336 (i.e., the distal end of the exposed primary jacket 328) can be placed at the first indicator 306, and the second conductor 336 can be cut at the fourth indicator 316 (e.g., so that the exposed portion of the second conductor 336 extends from the first indicator 306 to the fourth indicator 316). Alternatively, it is contemplated that the fourth indicator 316 could be located at a position between the third indicator 312 and the first indicator 306 that indicates a position to cut the second conductor 336 when the distal end of the exposed primary jacket 328 is positioned at the third indicator 312.

Furthermore, as shown in FIG. 9, the installation tool 300 can include a number of retainers that can perform similar functions to the retainers included in the installation tool 204 described above in conjunction with FIGS. 4A-7. For example, the installation tool 300 can include a number of tubing retainers 350, 352, 354, 356, 358. The installation tool 300 can also include a number of connector retainers, such as connector retainer 360.

In some embodiments, as shown in FIG. 10, the installation tool 300 can further include one or more cutouts, such as cutouts 362A, 362B, 362C, 362D, 362E, 362F, 362G, 362H, 362I, 362J. The cutouts of 362A-J can extend through the installation tool 300 (e.g., through a bottom 364 of the installation tool 300). As described above, the body 305 may be formed from an injection molding process. The cutouts 362A-J can be part of the injection molding process (e.g., as bypassing shutoffs) in order to form the channels and cavities. Additionally, in some embodiments, the cutouts 362A-J can increase the flexibility of the installation tool 300 along the ZZ axis in the negative direction while keeping enough rigidity to retain any tubings and connectors retained by the installation tool 300 during installation of the tubings and connectors.

In light of the above, it is understood that certain embodiments of the installation tool 204 in FIGS. 4A-7 and the installation tool 300 in FIGS. 8-10 can assist in the installation and splicing of certain heating cables including fiber wrap heating cables such as an nVent Raychem KTV or XTV cable (e.g., the heating cable 100 in FIG. 1), power limiting heating cables such as an nVent Raychem VPL cable (e.g., the heating cable 120 in FIG. 2), monolithic cables such as an nVent Raychem BTV or QTVR cable (e.g., the heating cable 150 in FIG. 3), and/or other cables that include two or more parallel bus wires requiring insulating parts between two or more electrical terminals.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An installation tool for installing a splice kit for a heating cable, the installation tool comprising:
a body;
a first channel defined in the body to retain a first insulating tubing of the splice kit, the first insulating tubing receiving a conductor of a first section of the heating cable; and
a first cavity within the first channel, the first cavity retaining a first connector of the splice kit, the first connector electrically connecting the conductor of the first section of the heating cable and a conductor of a second section of the heating cable,
the body retaining the first insulating tubing and the first connector in a predetermined formation during installation of the first insulating tubing and the first connector to the heating cable, the body being removable following installation.

2. The installation tool of claim 1 and further comprising a second channel defined in the body and configured to retain a second insulating tubing of the splice kit; and
a second cavity within the second channel, the second cavity configured to retain a second connector of the splice kit,
wherein the first channel and the second channel are aligned parallel to each other to receive parallel conductors of the heating cable.

3. The installation tool of claim 2, wherein the first cavity and the second cavity are positioned at different lengths along the first channel and the second channel, respectively, so that they are not adjacent each other.

4. The installation tool of claim 1 and further comprising an interior retainer and an exterior retainer configured to retain the first connector within the first cavity.

5. The installation tool of claim 4, wherein each of the interior retainer and the exterior retainer comprises a protrusion that extends inwards towards the first connector.

6. The installation tool of claim 5, wherein the interior retainer is configured to apply a first force at an angle approximately orthogonal to a first surface of the first connector, and the exterior retainer is configured to apply a second force at an angle approximately orthogonal to a second surface of the first connector.

7. The installation tool of claim 1 and further comprising a tubing retainer within the first channel, the tubing retainer and the first channel impinging on a majority of an outer surface of the first insulating tubing when the first insulating tubing is retained within the first channel.

8. The installation tool of claim 1, wherein the body comprises a single piece construction.

9. The installation tool of claim 8, wherein the body is formed by injection molding.

10. The installation tool of claim 1 and further comprising a wire stripping guide including at least one indicator.

11. The installation tool of claim 10, wherein the at least one indicator includes:
a first indicator indicative of a position to align a cut end of the heating cable;
a second indicator indicative of a length of an outer jacket of the heating cable to remove starting from the first indicator; and
a third indicator indicative of a length of a primary jacket of the heating cable to remove starting from the first indicator.

12. An installation system for a heating cable, the installation system comprising:
a splice kit comprising:
a connector to electrically connect a first conductor and a second conductor of the heating cable,
a first insulating tubing to receive the first conductor, and
a second insulating tubing to receive the second conductor; and
an installation tool to retain the connector, the first insulating tubing, and the second insulating tubing in a predetermined formation during installation;
the installation tool being removable following installation.

13. The installation system of claim 12, wherein the connector is a shear bolt connector comprising a shear bolt; and further comprising a hex wrench configured to turn the shear bolt.

14. The installation system of claim 12, wherein the connector is a shear bolt connector comprising two shear bolts.

15. The installation system of claim 12, wherein the connector comprises a first end and a second end, and in the predetermined formation in the installation tool, the first insulating tubing abuts the first end of the connector and the second insulating tubing abuts the second end of the connector.

16. The installation system of claim 12, wherein the installation tool comprising:
a body;
a first channel defined in the body and configured to retain the first insulating tubing and the second insulating tubing; and
a first cavity within the first channel, the first cavity configured to retain the connector.

17. A method of installing a splice kit on a heating cable, the method comprising:
retaining a first insulating tubing within a channel of an installation tool;
retaining a second insulating tubing within the channel of the installation tool;

retaining a connector within the channel of the installation tool between the first insulating tubing and the second insulating tubing;

inserting a first conductor of the heating cable through the first insulating tubing into the connector;

inserting a second conductor of the heating cable through the second insulating tubing into the connector; and tightening a bolt of the connector to electrically connect the first conductor to the second conductor.

18. The method of claim 17 and further comprising removing the first insulating tubing, the second insulating tubing, and the connector from the installation tool.

19. The method of claim 18 and further comprising covering the first insulating tubing, the second insulating tubing, and the connector with a covering.

20. The method of claim 19, wherein the covering comprises heat shrink tubing and further comprising shrinking the heat shrink tubing.

\* \* \* \* \*